INVENTOR:
RAFFAELLO MAESTRELLI
By E. M. Squire
HIS ATTY.

INVENTOR:
RAFFAELLO MAESTRELLI
by E. M. Squire
HIS ATTY

United States Patent Office 3,338,182
Patented Aug. 29, 1967

3,338,182
PNEUMATIC-TIRED VEHICLE STEERED BY VERTICAL SPACED GUIDE TRACK SURFACES
Raffaello Maestrelli, Via Carnaghi 2, Milan, Italy
Filed Dec. 4, 1964, Ser. No. 415,899
Claims priority, application Italy, Dec. 5, 1963, 24,950/63
7 Claims. (Cl. 104—247)

ABSTRACT OF THE DISCLOSURE

A pneumatic-tired vehicle steered by vertical uniformly spaced guide track surfaces. Individually steerable load carrying axles are pivoted at points spaced along the longitudinal axis of the vehicle. The turning angles are so selected that the vehicle accurately follows a curve without lateral slippage of the tires. Pairs of individually pivoted wheels may be steered in unison with the same effect as steering the axles.

---

Conventional steering systems of this type use four wheeled trucks wherein the same turning angle is necessarily imparted to both axles of the truck by the guiding unit. On a curve, the turning angle which is correct for one of the truck axles is incorrect for the other. Accordingly, lateral slippage of the tires cannot be prevented and curves must have a large minimum radius to prevent the slippage from being objectionable.

The invention is described in greater detail in the following specification with reference to the accompanying drawing forming a part hereof.

Figure 5:
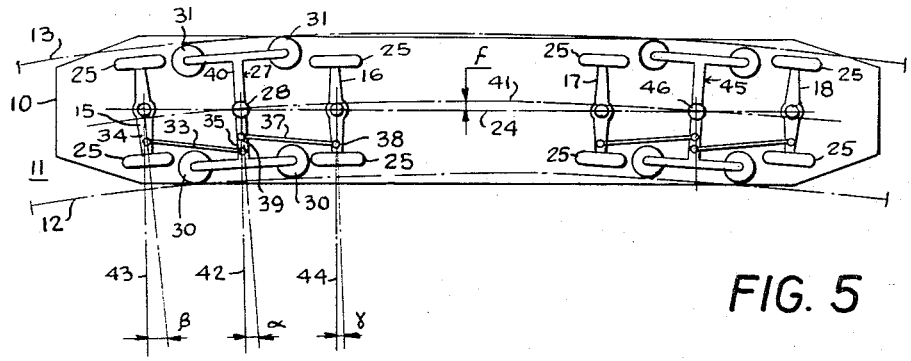

FIGURE 5 is a diagrammatic plan view of a vehicle provided with four longitudinally spaced load supporting axles, each axle being individually pivoted for steering movement about a vertical axis located on the longitudinal center line of the vehicle, linkage being provided whereby the angular displacements of the end axles in response to displacements of the steering or guide wheels is greater for the axles located nearer to the ends of the vehicle than for the axles located nearer to the center of the vehicle.

Figure 6:
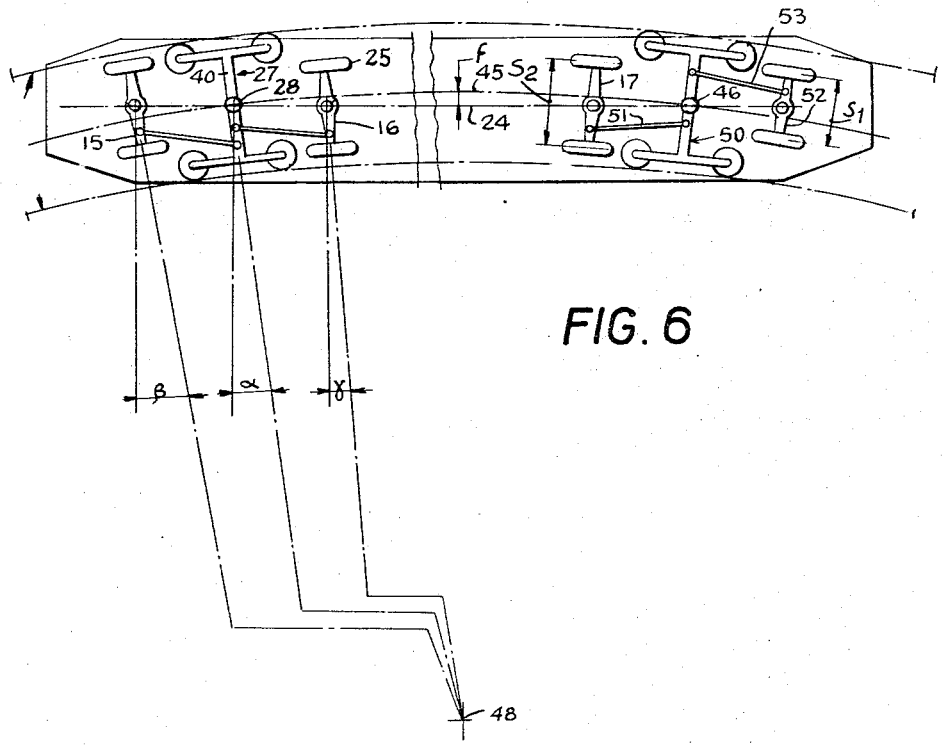

FIGURE 6 is a diagrammatic plan view of a vehicle similar to the vehicle of FIG. 5 running in a curve of shorter radius than that shown in FIG. 5, the wheels on the right hand end axle having a narrower tracking gauge than the wheels on the centrally located axle which is steered therewith.

A solution disclosed in prior patents of the same applicant (FIGS. 1 and 2) provides that the coach is supported by three or four axles, one or two of which, rigid, are located at the centre portion of the coach, the other two steering axles being located at the end portions thereof. For simplicity of illustration, the steering axles are shown centrally pivoted intermediate their ends. It will be understood, however, that the axle may be fixed or omitted and the wheels individually pivoted and connected to turn in unison as in the case of the front wheels of an automobile (FIG. 1).

Figures 1, 2, 3, 4:
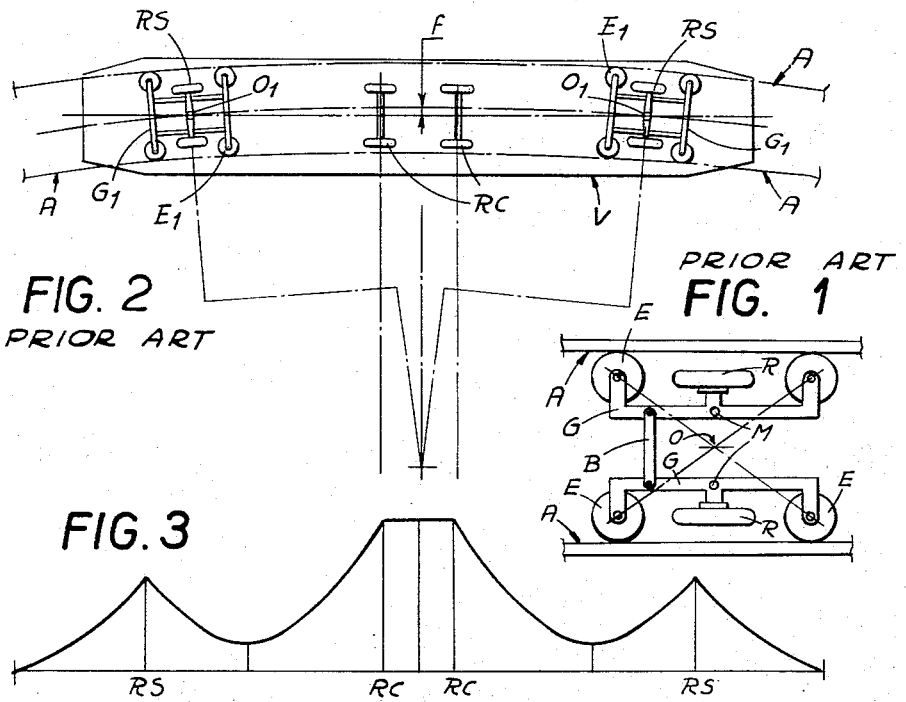
FIGURE 1 is a diagrammatic plan view illustrating a track-guided bogie having two load supporting wheels each equipped with a pneumatic tire, the two wheels being pivoted for steering movement about transversely spaced vertical axes.
FIGURE 2 is a diagrammatic view showing the outline of a vehicle supported on two guided bogies each having a single load supporting axle associated with two wheels equipped with pneumatic tires, two additional load supporting axles being provided at the central portion of the vehicle.
FIGURE 3 is a bending moment diagram for a vehicle with four supporting axles spaced longitudinally of the vehicle as illustrated in FIG. 1.
FIGURE 4 is a bending moment diagram similar to FIG. 3, except that the intermediate supporting axles are omitted, the vehicle being supported only in proximity to its ends in conventional manner.

Referring to the drawing:

In the case wherein individually pivoted steering wheels are used as shown in FIG. 1, each journal of each wheel R is integral with a guiding yoke G, which is pivoted to the vehicle body at M and bears at the two ends two horizontal guiding wheels E co-operating with the side walls A. The two yokes are connected to each other by a link member B in such a manner that the guiding member effectively comprises four wheels E moving together on a horizontal plane and pivoting around the two steering pivots M of the wheels. The lines diagonally connecting the centers of the wheels E always cross, for large radius curves, at the point O.

If the arrangement of FIG. 2 is adopted, with axles or bogies $G_1$ pivotable around central pivots $O_1$, then the guiding unit for the load carrying wheels RS is formed by four horizontal guide wheels $E_1$ all of which pivot as a unit about the point $O_1$, being borne by the bogie or truck frame $G_1$.

In both cases each guiding assembly is formed by four horizontal guiding wheels E or $E_1$ located at the apexes of a quadrilateral each being free to rotate around its own vertical axis and all together being free to pivot in a horizontal plane around a centre placed, in each instance, at the crossing $O_1$ or substantially at the crossing O between the diagonals connecting the centres of the opposite wheels E or $E_1$. The four wheels E or $E_1$ form the guiding unit and are constrained to remain between the guiding walls or side walls A, against which they roll. The centres O or $O_1$ of the guiding quadrilateral always remain in the longitudinal centerline plane of the road surface between guide wall $a$, whatever may be the position assumed by the coach, which is forced to have a position wherein its longitudinal center line forms a chord joining the two pivot points O or $O_1$ of the two vehicle bogies, when the vehicle travels along a curve. The central displacement ($f$) will be greater as the distance between the centres O or $O_1$ is increased and smaller as the curve radius is increased.

The end steering wheels RS of the coach V are at each instant, oriented according to the chord of the contact points of the wheels E of the same bogie with the side wall, and do not undergo any sliding or slip. However the central wheels RC mounted on fixed axles are subjected to lateral slippage during three stages. During the first stage they must travel transversely through the distance ($f$) of the central displacement, from the instant in which the coach begins to enter into the curve from the straight track, to the moment in which all the vehicle wheels run along a constant curvature line. During the second stage, all the axles are aligned with the instantaneous rotation centre and thus no slip occurs. During the third stage, when the vehicle leaves the curve to return onto the straight track, the central wheels must travel the above distance ($f$) in the opposite direction. The first and third stages are the critical ones, because the central wheels RS must slip transversely; terming by ($t$) the time required for these stages, slips occur when the lateral slippage velocity $f/t$ of the central wheels RC exceeds the elasticity limits of the tire. By arranging some sections with increasing curvature, between the straight length and the main curve, having a length of at least 120 metres, this slipping can be made negligible, or substantially undetectable, provided that the pitch, that is the distance between the points O or $O_1$, does not exceed about 10 metres, the curve radius is at least 180 metres, and the coach speed during travel in the curve does not exceed 12 metres/sec.

However it is to be remembered that, when these limiting situations do not occur, the tare reduction obtained in consequence of the multiple supports of the body of the coach is so important as to widely compensate for the disadvantage of possible slippage. In fact, it is to be considered that in the coach with four supports the roof is always subjected to tension while in the conventional coach with only two supports, having the same distance between the two centres O or $O_1$ the roof undergoes high compression stresses, as it may be easily noted from comparative examination of the diagrams of the bending moments for the two cases diagrammatically illustrated in FIGS. 3 and 4, which show the diagrams of the moments for the four-supports coach RS, RC, RC, RS (FIG. 3) and respectively for the two-supports coach RX (FIG. 4).

FIGS. 5 and 6 illustrate curve guiding arrangements for the usual curvature and, for explanatory purposes, also for very short radius curvatures, with respect to vehicles embodying the invention.

Referring to FIG. 5, a vehicle comprising an elongated body 10 is shown movable on a road surface 11 which lies between two vertical guide walls 12, 13. The vehicle 10 is supported on four load carrying axles 15–18 which are individually pivoted to the body 10 at 20–23 for steering movement about vertical axes located along the longitudinal center line 24 of the vehicle. Each of the axles 15–18 is provided at its ends with two pneumatic tires 25 which roll along the road surface 11.

Intermediate the axles 15 and 16, there is an H-shaped steering member 27. The steering member 27 is pivoted to the body 10 at 28 for movement about a vertical axis located on the center line 24 of the vehicle. The steering member 27 carries two wheels 30 which engage the inner surface of the guide wall 12 and two wheels 31 which engage the inner surface of the other guide wall 13. The steering member 27 is connected by a link 33 to the end axle 15 which is pivoted at 34 to the axle 15 and at 35 to the steering member 27. The steering member 27 is also connected to the intermediate axle 16 by a link 37 which is pivoted to the axle 16 at 38 and to the steering member 27 at 39.

The action of the steering member 27 is such that its cross-piece 40 is always directed toward the center of curvature of the curve 41 which represents the center line of the road surface 11. At the middle of the vehicle, the curved center line 41 is displaced outwardly from the center line 24 of the vehicle by a distance $f$. The cross member 40 makes an angle $\alpha$ with the perpendicular 42 to the vehicle axis 24 passing through pivot point 28. The link 33 is so arranged that the axle 15 makes an angle $\beta$ with the perpendicular 43 to the vehicle axis 24 passing through the pivot point 20. The angle $\beta$ is greater than the angle $\alpha$ and is so selected that the axle 15 is directed toward the center of curvature of the curve. The link 37 is so arranged that the axle 16 makes an angle $\gamma$ with the perpendicular 44 to the vehicle axis 24 passing through the pivot point 21. The angle $\gamma$ is smaller than either of the angles $\alpha$ or $\beta$ and is so selected that axle 16 is directed toward the center of curvature. Since the axles 15 and 16 are directed toward the center of curvature, their tires 25 will accurately track the curvature of the center line 41 without side slippage. At the other end of the vehicle, an H-shaped steering member 45 pivoted to the body 10 at 46 steers the axles 17 and 18 to track the curvature without side slippage in the same manner as the steering member 27 described above.

Referring to FIG. 6, the radius of curvature of the center line curve 45 is considerably shorter than that illustrated in FIG. 5. Accordingly, the angles $\alpha'$, $\beta'$, and $\gamma'$ are correspondingly greater in order to direct the axles 15 and 16 toward the center of curvature which is indicated diagrammatically at 48.

An H-shaped steering member 50 pivoted at 46 is connected by a link 51 to steer the axle 17 as in the case of FIG. 5. An axle 52 is connected by a link 53 to be steered by the member 50, the link 53 being on the opposite side of pivot point 46 from the link 51. Additionally, the axle 52 is shorter than the axle 17 providing a gauge $S_1$ which is narrower than the gauge $S_2$ of axle 17. By using different gauges for the various axles, the wear of the vehicle tires may be distributed laterally over the road surface 11, if desired.

While I have shown and described what I believe to be the best embodiments of my invention, it will be apparent to those skilled in the art that various changes and modifications may be made therein without departing from the spirit and scope of the invention as defined in the appended claims.

What I claim is:

1. A vehicle of the class described, comprising: an elongated body; four generally transversely extending load supporting axles disposed beneath said body intermediate the ends thereof; means mounting each of said axles for pivotal steering movement about a vertical axis located on the longitudinal center line of said body, each of said vertical axes passing through the midpoint of one of said supporting axles, said axles being arranged in groups of two, each group being located in proximity to one end of said body; a steering member mounted for pivotal movement about a separate vertical axis located on said longitudinal center line and spaced from all of said first-named vertical axes; a plurality of guide wheels each revoluble about a vertical axis spaced from all other vertical axes, said guide wheels being carried by said steering member and mounted for engagement with uniformly spaced vertical guide track surfaces extending along opposite sides of a road surface; a road wheel including a pneumatic tire at each end of each of said load supporting axles, each of said road wheels being supported by said road surface; and linkage means connecting said steering member to at least two axles in one of said groups, said linkage means imparting a greater angular displacement to the one of said axles which is nearer to the proximate end of said vehicle than to the axle of said group which is more remote therefrom.

2. A vehicle according to claim 1, wherein said steering members are two in number, each of said steering members being located symmetrically between the two axles of one of said groups.

3. A vehicle according to claim 2, wherein said linkage means comprises a plurality of link members each connecting one of said steering members to one of the axles of the group between which said one steering member is located, the distances between the connections of said link members and said vertical axes being selected to impart said greater angular displacement.

4. A vehicle according to claim 1, wherein the end axle of one of said groups which is nearer to the proximate end of said body is shorter than the other axle of said group.

5. A vehicle for operation on a road surface extending laterally between two uniformly spaced vertical guide surfaces, said vehicle comprising: an elongated body; a plurality of steerable wheels each having a resilient tire thereon in load supporting engagement with said road surface, said wheels supporting said body for movement along said road surface; at least one steering means pivoted to said body, said steering means comprising at least two wheels in continuous engagement with one of said guide surfaces and at least two wheels in continuous engagement with the other guide surface; and means connecting said steering means to said wheels for imparting angular steering displacements thereto, the angular displacements imparted to wheels remote from the middle of said vehicle being greater than the displacements imparted to wheels nearer said middle for causing said tires to track a curve in said road surface, whereby side slippage of said tires on said road surface is avoided.

6. A vehicle according to claim 5, wherein said steering means comprises an H-shaped frame carrying four wheels, and in which said means connecting said steering means to said wheels comprises link members controlled by said frame.

7. A vehicle according to claim 5, wherein the gauge of said remote wheels is greater than the gauge of said nearer wheels.

References Cited

UNITED STATES PATENTS

| | | | |
|---|---|---|---|
| 1,388,508 | 8/1921 | Brilhart | 105—168 |
| 1,781,334 | 11/1930 | Liechty | 105—168 |
| 3,113,529 | 12/1963 | Mastrelli | 104—247 |

ARTHUR L. LA POINT, *Primary Examiner.*

D. F. WORTH, *Assistant Examiner.*